(12) United States Patent
Golding et al.

(10) Patent No.: US 8,909,380 B2
(45) Date of Patent: Dec. 9, 2014

(54) INTELLIGENT LIGHTING MANAGEMENT AND BUILDING CONTROL SYSTEMS

(71) Applicants: Jonathan Golding, Los Altos Hills, CA (US); Ajit Sanzgiri, Sunnyvale, CA (US)

(72) Inventors: Jonathan Golding, Los Altos Hills, CA (US); Ajit Sanzgiri, Sunnyvale, CA (US)

(73) Assignee: enLighted, Inc., Sunnyvale, CA (US)

( * ) Notice: Subject to any disclaimer, the term of this patent is extended or adjusted under 35 U.S.C. 154(b) by 0 days.

(21) Appl. No.: 13/751,059

(22) Filed: Jan. 26, 2013

(65) Prior Publication Data

US 2013/0134886 A1 May 30, 2013

Related U.S. Application Data

(63) Continuation of application No. 12/584,444, filed on Sep. 5, 2009, now Pat. No. 8,457,793.

(51) Int. Cl.
*G05B 13/00* (2006.01)
*G05B 15/00* (2006.01)
*H05B 37/02* (2006.01)
*H05B 37/00* (2006.01)

(52) U.S. Cl.
CPC ............... *H05B 37/02* (2013.01); *H05B 37/00* (2013.01); *H05B 37/0254* (2013.01); *Y02B 20/48* (2013.01)
USPC ................... 700/275; 700/9; 700/28; 700/83; 315/294; 315/149; 315/297

(58) Field of Classification Search
None
See application file for complete search history.

(56) References Cited

U.S. PATENT DOCUMENTS

| | | | |
|---|---|---|---|
| 5,101,141 A | 3/1992 | Warner et al. | |
| 5,179,324 A | 1/1993 | Audbert | |
| 5,191,265 A | 3/1993 | D'Aleo et al. | |
| 5,283,516 A | 2/1994 | Lohoff | |
| 5,812,422 A | 9/1998 | Lyons | |
| 5,875,108 A * | 2/1999 | Hoffberg et al. | 700/17 |
| 5,903,454 A * | 5/1999 | Hoffberg et al. | 700/83 |
| 5,920,477 A * | 7/1999 | Hoffberg et al. | 382/181 |
| 5,965,308 A * | 10/1999 | Ozawa | 430/30 |
| 6,057,654 A | 5/2000 | Cousy et al. | |
| 6,188,181 B1 | 2/2001 | Sinha et al. | |
| 6,342,994 B1 | 1/2002 | Cousy et al. | |
| 6,548,967 B1 | 4/2003 | Dowling et al. | |
| 6,591,025 B1 * | 7/2003 | Siems et al. | 385/12 |
| 6,889,153 B2 * | 5/2005 | Dietiker | 702/104 |
| 7,014,336 B1 * | 3/2006 | Ducharme et al. | 362/231 |
| 7,124,048 B2 * | 10/2006 | Dietiker | 702/104 |
| 7,242,988 B1 * | 7/2007 | Hoffberg et al. | 700/28 |
| 7,253,942 B2 * | 8/2007 | Belliveau | 359/292 |
| 7,288,896 B2 * | 10/2007 | Edelbrock | 315/169.3 |
| 7,309,985 B2 | 12/2007 | Eggers et al. | |
| 7,348,736 B2 | 3/2008 | Piepgras et al. | |
| 7,382,271 B2 | 6/2008 | McFarland | |

(Continued)

*Primary Examiner* — Mohammad Ali
*Assistant Examiner* — Kelvin Booker
(74) *Attorney, Agent, or Firm* — Brian R. Short (57) ABSTRACT

Methods, systems and apparatuses for controlling and managing a plurality of luminaires are disclosed. One method includes sensing, by a sensor of each of the plurality of luminaires, light received by the sensor, communicating, by a device, with the plurality of luminaires by a device through light pulses, commissioning and calibrating, by the device, the plurality of luminaires using the communication, and placing, by the device, at least one of the plurality of luminaires on a floor plan through the communication with light pulses, wherein the at least one of the plurality of luminaires identifies itself over a network.

13 Claims, 3 Drawing Sheets

(56) References Cited

U.S. PATENT DOCUMENTS

| | | |
|---|---|---|
| 7,437,596 B2 | 10/2008 | McFarland |
| 7,550,931 B2 | 6/2009 | Lys et al. |
| 7,566,137 B2 | 7/2009 | Veskovic |
| 7,572,028 B2 * | 8/2009 | Mueller et al. ............... 362/227 |
| 7,623,042 B2 | 11/2009 | Huizenga |
| 7,792,956 B2 | 9/2010 | Choong et al. |
| 7,881,878 B2 * | 2/2011 | Burrus et al. ................... 702/28 |
| 7,925,384 B2 | 4/2011 | Huizenga et al. |
| 7,959,320 B2 * | 6/2011 | Mueller et al. ............... 362/231 |
| 8,100,552 B2 * | 1/2012 | Spero ............................ 362/231 |
| 8,321,126 B2 * | 11/2012 | Mays ............................ 701/428 |
| 8,374,383 B2 * | 2/2013 | Long et al. .................... 382/100 |
| 8,457,793 B2 * | 6/2013 | Golding et al. ............... 700/275 |
| 8,535,247 B2 * | 9/2013 | Williams ...................... 600/595 |
| 2003/0033102 A1 * | 2/2003 | Dietiker ........................ 702/85 |
| 2003/0133292 A1 * | 7/2003 | Mueller et al. ............... 362/231 |
| 2004/0002792 A1 | 1/2004 | Hoffknecht |
| 2004/0105264 A1 * | 6/2004 | Spero ............................ 362/276 |
| 2005/0027462 A1 * | 2/2005 | Goode et al. .................... 702/22 |
| 2005/0047133 A1 * | 3/2005 | Pitigoi-Aron et al. ......... 362/231 |
| 2005/0169643 A1 | 8/2005 | Franklin et al. |
| 2005/0180603 A1 * | 8/2005 | Zoghlami et al. ............. 382/103 |
| 2005/0278047 A1 | 12/2005 | Ahmed |
| 2005/0285547 A1 * | 12/2005 | Piepgras et al. .............. 315/294 |
| 2006/0122801 A1 * | 6/2006 | Dietiker ........................ 702/104 |
| 2006/0275040 A1 | 12/2006 | Franklin |
| 2007/0057807 A1 | 3/2007 | Walters et al. |
| 2007/0061022 A1 * | 3/2007 | Hoffberg-Borghesani et al. ............................... 700/83 |
| 2007/0061023 A1 * | 3/2007 | Hoffberg et al. ................ 700/83 |
| 2007/0061050 A1 | 3/2007 | Hoffknecht |
| 2007/0086128 A1 | 4/2007 | Lane et al. |
| 2007/0110290 A1 * | 5/2007 | Chang et al. .................. 382/128 |
| 2007/0115658 A1 * | 5/2007 | Mueller et al. ............... 362/231 |
| 2007/0115665 A1 * | 5/2007 | Mueller et al. ............... 362/276 |
| 2007/0116347 A1 * | 5/2007 | Hong ............................ 382/131 |
| 2007/0215794 A1 | 9/2007 | Cernasov et al. |
| 2008/0185977 A1 | 8/2008 | Veskovic et al. |
| 2008/0244104 A1 | 10/2008 | Clemente |
| 2008/0265796 A1 | 10/2008 | Null |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2009/0267540 A1 * | 10/2009 | Chemel et al. ................ 315/297 |
| 2010/0026809 A1 * | 2/2010 | Curry ............................ 348/157 |
| 2010/0034386 A1 | 2/2010 | Choong et al. |
| 2010/0135186 A1 | 6/2010 | Choong et al. |
| 2010/0141153 A1 * | 6/2010 | Recker et al. ................. 315/149 |
| 2010/0149967 A1 * | 6/2010 | Johansen ...................... 370/225 |
| 2010/0231513 A1 * | 9/2010 | Deliwala ...................... 345/158 |
| 2010/0259931 A1 * | 10/2010 | Chemel et al. ............ 362/249.02 |
| 2010/0262296 A1 * | 10/2010 | Davis et al. ................... 700/275 |
| 2010/0264846 A1 * | 10/2010 | Chemel et al. ................ 315/294 |
| 2010/0270933 A1 * | 10/2010 | Chemel et al. ................ 315/130 |
| 2010/0282847 A1 * | 11/2010 | Lei et al. ...................... 235/438 |
| 2010/0295473 A1 * | 11/2010 | Chemel et al. ................ 315/294 |
| 2010/0295474 A1 * | 11/2010 | Chemel et al. ................ 315/294 |
| 2010/0295475 A1 * | 11/2010 | Chemel et al. ................ 315/294 |
| 2010/0295482 A1 * | 11/2010 | Chemel et al. ................ 315/312 |
| 2010/0296285 A1 * | 11/2010 | Chemel et al. ................ 362/235 |
| 2010/0301768 A1 * | 12/2010 | Chemel et al. ................ 315/294 |
| 2010/0301769 A1 * | 12/2010 | Chemel et al. ................ 315/294 |
| 2010/0301770 A1 * | 12/2010 | Chemel et al. ................ 315/294 |
| 2010/0301771 A1 * | 12/2010 | Chemel et al. ................ 315/294 |
| 2010/0301774 A1 * | 12/2010 | Chemel et al. ................ 315/297 |
| 2010/0301777 A1 | 12/2010 | Kraemer |
| 2010/0301834 A1 * | 12/2010 | Chemel et al. ................ 324/105 |
| 2010/0302779 A1 * | 12/2010 | Chemel et al. ............ 362/249.02 |
| 2010/0327766 A1 * | 12/2010 | Recker et al. ................. 315/291 |
| 2011/0001436 A1 * | 1/2011 | Chemel et al. ................ 315/291 |
| 2011/0001438 A1 * | 1/2011 | Chemel et al. ................ 315/297 |
| 2011/0031897 A1 | 2/2011 | Henig et al. |
| 2011/0117025 A1 * | 5/2011 | Dacosta et al. ................ 424/9.6 |
| 2011/0121654 A1 * | 5/2011 | Recker et al. ................... 307/66 |
| 2011/0133655 A1 * | 6/2011 | Recker et al. ................. 315/159 |
| 2011/0199010 A1 | 8/2011 | Cho et al. |
| 2011/0264010 A1 * | 10/2011 | Williams ...................... 600/595 |
| 2012/0001548 A1 * | 1/2012 | Recker et al. ................... 315/86 |
| 2012/0155253 A1 * | 6/2012 | Johansen ...................... 370/228 |
| 2012/0194083 A1 * | 8/2012 | Henig et al. .................. 315/152 |
| 2012/0235579 A1 * | 9/2012 | Chemel et al. ................ 315/152 |
| 2013/0113291 A1 * | 5/2013 | Recker et al. ................... 307/80 |
| 2013/0193847 A1 * | 8/2013 | Recker et al. ................... 315/86 |
| 2013/0285558 A1 * | 10/2013 | Recker et al. ................. 315/153 |

* cited by examiner

FIGURE 3

INTELLIGENT LIGHTING MANAGEMENT AND BUILDING CONTROL SYSTEMS

RELATED APPLICATIONS

This patent application is a continuation of U.S. patent application Ser. No. 12/584,444, filed Sep. 5, 2009, which claims priority to provisional patent application 61/191,636 filed Sep. 10, 2008.

BACKGROUND

Solid State Lighting is the third revolution in illumination, after the invention of fire and electricity-based lighting. The existing approaches to managing lighting are all enhancements to the second wave, electrically-based lighting, where typically each light fixture, sensor and human interface device is independently powered at building voltage levels, occasionally at low voltage. State of the art Light Management Systems (LMS) allow centralized management of single lights or groups of lights through software, with hardware controls typically located at each sensor or switch used to control light levels directly, or through the LMS.

The emergence of low-power, high intensity LEDs, semiconductors, for general illumination, combined with IP networking paradigms, makes practical a novel Lighting Management System to achieve granular control of lighting and thereby realize substantial energy savings. This same Management System, which consists of control elements installed in building plenums or above ceilings, can be used to simultaneously control and power a variety of systems, sensors and devices, including those used for light sensing, day lighting and screening control, HVAC, security, emergency, surveillance, building access and building and environmental control. This list of sensors and devices is for illustrative purposes and not meant to be exhaustive. We refer to this combined system as a Building Control System, or BCS.

DESCRIPTION OF EMBODIMENTS

The described embodiments provide methods for powering, controlling and optimally managing solid state lighting (SSL) for energy and cost efficiencies, and for human comfort and productivity, and provide methods for controlling luminaires and devices, including sensors, in a building, and provide methods for managing and controlling sensor devices and utilizing the sensor input to control and manage other devices, including those used for lighting, HVAC, security, emergency, surveillance, building access and building and environmental control.

One method includes an appliance, described as a Control Engine, or CE, that centrally powers and manages SSL luminaires, sensors and other devices. In one embodiment, the Control Engine connects to the building electrical system, either directly wired or through a socket, and distributes low voltage to power each luminaire and each device. The devices are connected to, powered and controlled by this Control Engine, typically connected over a wire pair for power and communication, or a pair for each. Numerous Control Engines can be connected over Ethernet/IP to form a light management or building control system, or BCS. Another element in the LMS or BCS is a central management system, or CMS, to manage the network of Control Engines and connected devices.

The BCS manages all devices and sensors from the Control Engines, based on policies installed by the CMS. The CEs form peer relationships to share relevant sensor and device data in order to execute a variety of algorithms, including discovery of luminaires, sensors and devices; luminaire, device and sensor topology and adjacencies, CE adjacencies, binding of human interface devices to luminaires and zones, calibration, configuration; light management, including daylight harvesting, task, scene and emergency lighting and demand response management.

The BCS provides a high level of granular control by including a range of low cost sensors or devices in each luminaire or other device, including light, temperature, occupancy, monitoring and video sensors or devices. Luminaires in this and typical topologies are mounted in the ceiling, often one every 40 to a 100 square feet. By including sensors in each luminaire or device, it and other devices can be controlled individually, and the BCS has visibility and control over an entire building floor. Motion and occupancy sensors are typically expensive and often deployed in rooms or zones, controlling multiple lights. By including low-cost sensors in each luminaire, the BCS can provide individual luminaire control.

Figure 1:
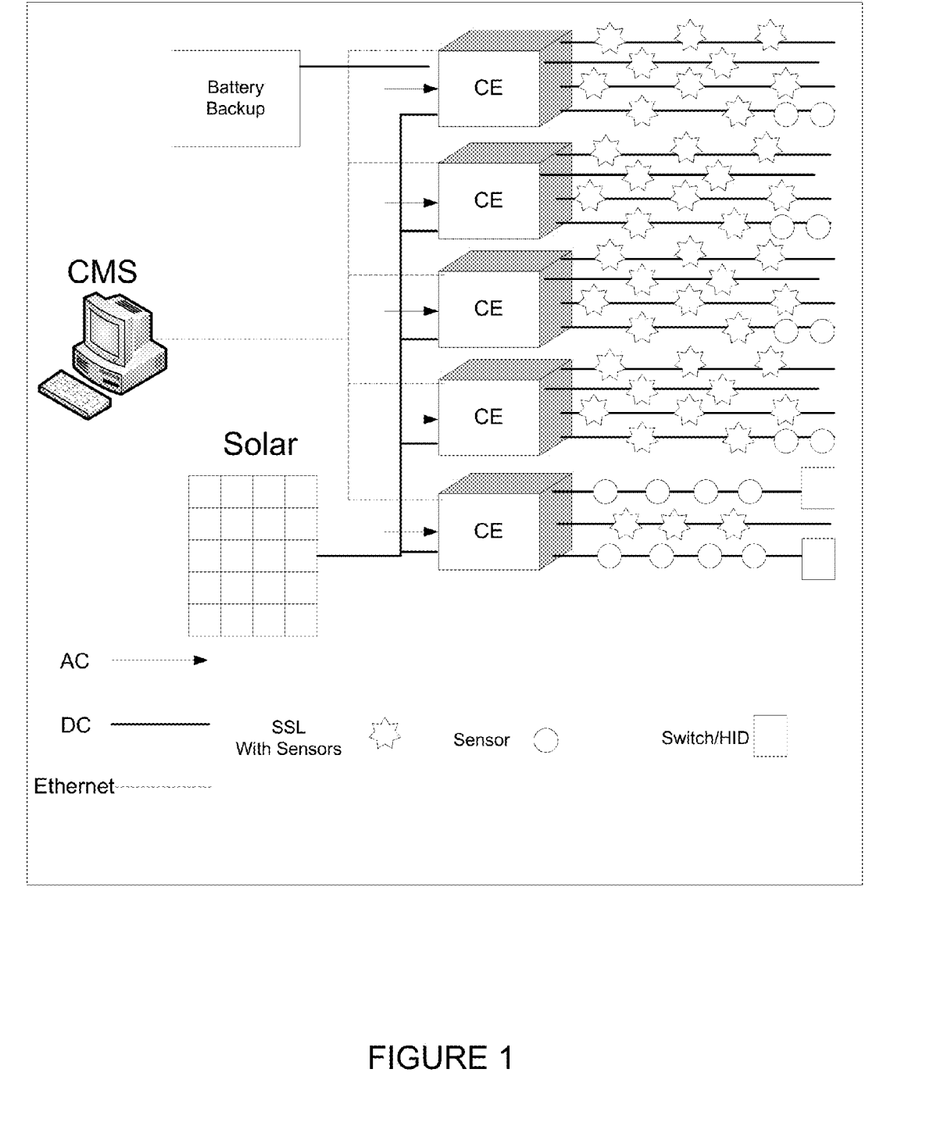
FIG. 1 shows a building control system, according to an embodiment.

FIG. 1 shows a building control system, according to an embodiment.

A Software Based System for Lighting Control

The described embodiments provide a LMS for the real time control and management of the lighting infrastructure of buildings with a view to optimizing the use of electrical power and to providing more visibility into power consumption.

The proposed system consists of three major architectural abstractions respectively named the device layer, the enforcement layer and the management layer. The device layer consists of sensors that can report relevant metrics (for example ambient light levels, temperature gauges, motion detectors, occupancy sensors and other relevant aspects of the environment) as well as lighting devices such as solid state LEDs, fluorescent light fixtures etc. The power required by luminaires for light elements, such as high-illumination LEDs, as well as for running embedded microcontrollers is assumed to be provided by components of the enforcement layer described below. In a preferred embodiment, the sensors and light elements will be packaged inside a single luminaire device. This will at a minimum include sensors for sensors for measuring ambient light and temperature and for detection of motion or human presence, together with an LED light element.

The enforcement layer is responsible for gathering measurements and applying sophisticated software algorithms in order to compute the desired levels of illumination and the power to be applied to lighting devices in order to achieve these levels. In a preferred embodiment this layer would be implemented as one or more software systems (hence referred to as Control Engines or CEs) consisting of a CPU complex, an operating system and additional software as needed to perform its function. It will contain dedicated power supplies and circuitry (for example IEEE 802.3 compliant Ethernet wiring to carry data and power) for obtaining measurements from sensors and for supplying power to lighting devices. This circuitry may optionally include an AC-to-DC conversion facility for powering luminaires if needed.

The management layer is responsible for management of the system. In a preferred embodiment it consists of a workstation (henceforth referred to as a Central Management System or CMS) consisting of one or more CPUs and an operating system together with additional software. This software will discover components of the system as they are commissioned, organize them into groupings, obtain user preferences and modify software algorithms accordingly. It will monitor the functioning of the system and report findings to system administrators. This reporting includes a system map, statistical data, alarms, system logs and reminders to users. The control layer will also be designed to accept requests to reduce power consumption (such as for example from public utility companies in times of power shortages) and modify power levels being supplied to light devices appropriately.

The components of the different layers will exchange information (e.g. measurements, configuration settings, operating state information, requests for statistics and responses to such requests) using proprietary data formats.

Figure 2:
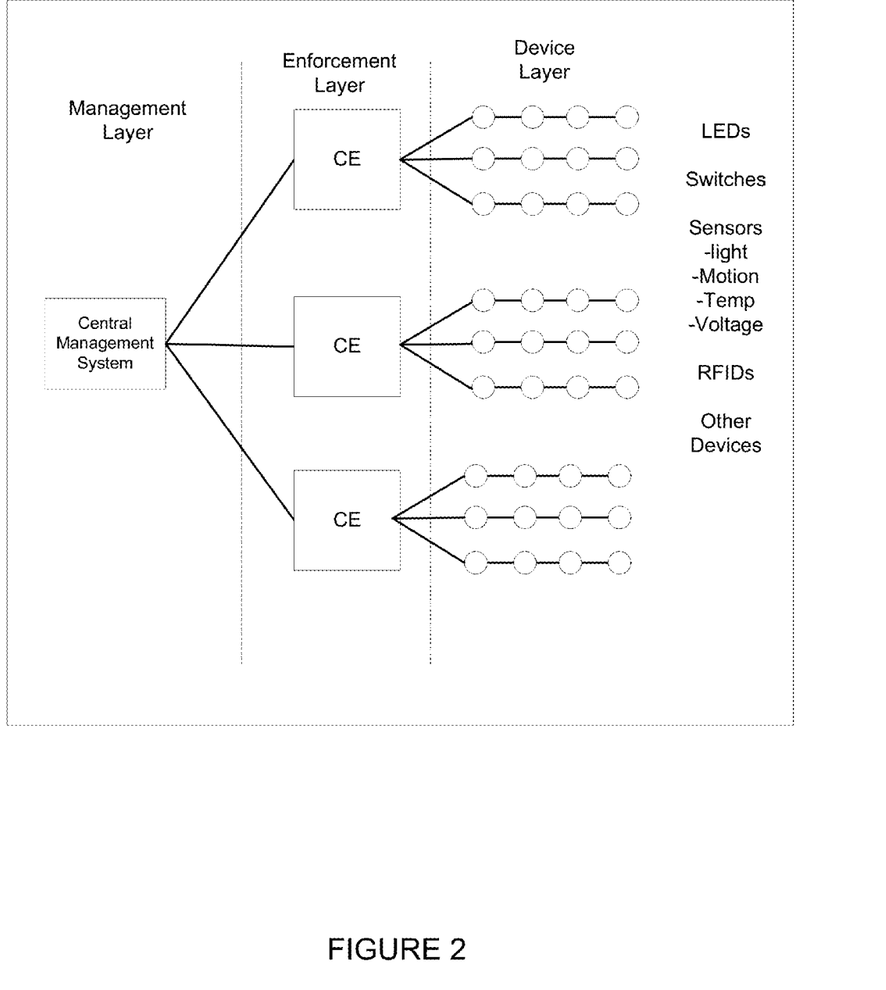
FIG. 2 shows a schematic of a building control system, according to an embodiment.

FIG. 2 shows a schematic of a building control system, according to an embodiment. The lines connecting the different entities represent cabling paths along which data and power travels among them. For example, the sensors (represented by small circles) in the device layer receive commands and report measurements to the CEs. Light devices in the device layer (similarly represented by circles) receive power from the CEs along these connections. Connections among the CEs represent pathways along which they share data such as policy, measurements and system topology. The lines connecting the Central Management System to the CEs represent data flow such as configurations and command/response sequences. As the diagram suggests, the entire system has a hierarchical structure where each entity aggregates and represents the entities below it to its peers and to other external entities.

Theory of Operation

Each CE detects sensors and lighting devices directly connected to it using a data protocol (to be described elsewhere.) Using proprietary algorithms described later in this specification, the CEs collaboratively deduce the spatial topology of the light devices and sensors. These spatial aggregations (referred to as 'lighting zones') are then reported to the Central Management System where a properly authorized user may (by logging in e.g. using a web browser or a similar tool) examine the topology or manually alter it or associate usage attributes to it. The user may at any time enter or alter policies such as daytime working hours, optimum light levels desired during day and night times and other parameters relevant to system operation.

The CEs can then monitor ambient light levels, the time of day and building occupancy to calculate the appropriate amount of power to be supplied to the lighting devices so as to maintain desired levels of illumination. In doing this they will in general need to share data relevant to the algorithm that decides the amount of power supplied to different devices. Additionally the Central Management System will expose an external data interface using which a duly authorized external user (e.g. a power utility company) may communicate indications of potential power shortages. The system may choose to respond by reducing its power usage—possibly at the cost of reduced lighting, air conditioning or powering down other devices.

Fault Tolerance and Recovery

Another aspect of the system is a multiplicity of measures designed to increase resiliency of operation in the event of malfunctioning components. We now describe some of these measures. One possible source of failures is the software running inside the CEs. Software is known to be subject to logical 'bugs' which can result in endless loops or deadlock conditions during which no useful work is performed and the software remains 'stuck'. This could result in the system becoming unresponsive to changing conditions or attempts to access it from the Central Management System. The system therefore proposes 'watchdog timers' in the CEs. These are so designed as to automatically restart the CE (e.g. by rebooting it) to a known responsive state in the event of these timers expiring. During normal healthy operating conditions it is the responsibility of the software to reset the timer periodically and prevent it from expiring. A related failure condition can occur if for a variety of reasons the power supply subsystem stops receiving commands from the CE. If this happens for a specified period of time, the subsystem (normally collocated inside the CE but operating autonomously) is designed to continue providing power at some pre-specified level.

This level could either be the last level as requested by the CE or a predetermined fixed threshold. The Central Management System could program either one of these preferences at the start of operations. This allows a 'headless' (less responsive) form of operation in case of a breakdown of the communication between the CE software and the power subsystem.

Failures at the sensor or lighting device layer must be guarded against by overprovisioning redundant sensors and devices.

Failures of the connectivity links between the different system entities must similarly be guarded against by overprovisioning measures commonly known in networking Manual Override An aspect of the system is the ability to manually override the automatic operation of the CEs with an external switch that puts the power supply subsystem in a mode whereby preset levels of power are supplied to the lighting and other devices and the CE's dynamic power supply algorithms are overridden. Although this has the external appearance of a light switch, in reality this is a user interface device to send a binary 'force on/off' command to the power subsystem that will control the operation of this mode. This feature may be used to prevent an outage in case of a system malfunction.

Clustering

Some existing lighting control solutions require that lighting devices in an area that must be controlled as a collection must be connected to and controlled by a single controller. This places restrictions on the number of such lighting devices as well as the topology of connections. Our solution lifts these restrictions by allowing the lighting devices under consideration to be connected to any one of multiple CEs. The aspect of our solution that makes this possible is called 'clustering' i.e. sharing of configuration and state information among multiple CEs whereby the relevant algorithms run in a distributed manner among multiple CPUs. Thus, for instance, all the lighting devices in a single large conference room need not be connected to and controlled by a single CE but may be distributed among multiple CEs. The CEs will share the measurements reported by different sensors so that the same algorithm may simultaneously run in all of them and power to each lighting device may be controlled by the CE connected to it.

The CEs form peer relationships to share relevant sensor and device data in order to execute a variety of algorithms, including discovery of luminaires, sensors and devices; luminaire, device and sensor topology and adjacencies, CE adjacencies, binding of human interface devices to luminaires and zones, calibration, configuration; light management, including daylight harvesting, task, scene and emergency lighting and demand response management.

Figure 3:
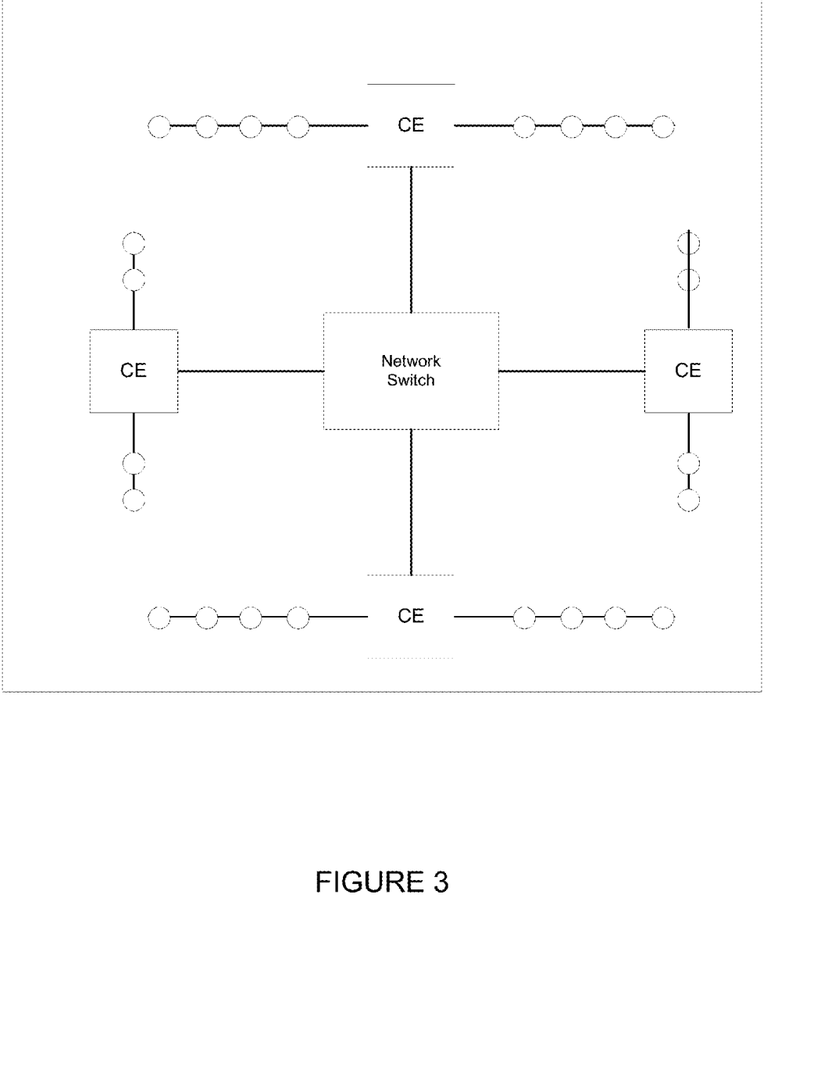
FIG. 3 illustrates how clustering may be used to distribute control of lights in an area, according to an embodiment.

Another aspect of clustering is that if one of the CEs in a cluster fails then the affected conference area can still be serviced by the remaining members of the cluster avoiding a single point of failure. Since many of the luminaires will be driven at much less than full power (50-70%), luminaires near one that fails can be driven at higher power and light levels. The above diagram illustrates how clustering may be used to distribute the control of lights in an area across multiple cooperating CEs.

FIG. 3 illustrates how clustering may be used to distribute control of lights in an area, according to an embodiment.

Commissioning

An embodiment of the BCS includes methods to ensure that the entire system is plug and play. CEs will detect each attached device and learn the identity of the device. CEs will also share peer information with each other, and will detect adjacent CEs and their attached devices, ensuring complete topology independence. Some of the claims of record are the methods used to determine adjacencies and topologies; this is achieved through sensors that adaptively sense adjacencies based on device output, including light from luminaires and temperature levels from HVAC devices.

Upon installation, a CE will discover other CEs by running a CE discovery algorithm and sending IP messages to discover other CEs attached to the building network. The algorithm allows CEs to also verify connectivity and adjacency thru the use of lights. A new CE, upon detecting other CEs, will negotiate for a time-slot to turn on all lights, allowing other CEs to detect the new CE through their light sensors.

After completing the CE discovery algorithm, the CE will negotiate for a time slot to run a device adjacency algorithm. In the case of luminaires, the testing CE will turn on each luminaire serially to allow it and other CEs to use their sensors to detect proximity to the lit luminaire. In one method, the testing CE will use a protocol to announce the device to be tested to other CEs, then solicit response back from CEs that detect adjacent light. The light levels are used to detect and measure proximity; therefore the algorithm is best run in darkness. The algorithm will allow adjacent devices in a zone as well as interconnected rooms to be detected, and allow the CMS to collect adjacency and build a composite map. Similar algorithms can be used with HVAC equipment.

HID devices, including light switches and touch-panels, also participate in these discovery algorithms. These HID devices can also include sensors to determine adjacencies and topology. One of the claims of record is the concept of a soft-switch, with dimmable properties, that can be dynamically bound to lights or zones. The soft-switch can be presented on a touch-panel, or on a computer. In one embodiment, multiple soft-switches can be dynamically instantiated in a touch-panel, based on the number of zones needed or dynamically created.

Another property of soft-switches is that unlike conventional light switches of various forms, the proposed HID devices can be bound—though software—to specific lights or groups of lights, called zones. An example might be to associate one or a bank of switches with groups of lights. This binding can be performed manually, or determined by the CE during the discovery process.

An example is the discovery of luminaires above an open floor area in a factory, or populated with cubicles. HID devices can be deployed at entry points to the open area. The installer can include sufficient switches to control each area, or install a touch panel to control the entire floor area. Another claim of record is n-way soft-switches; the soft-binding of HIDs connected to CEs eliminates the need for physical n-way switches, and the cost associate with the switches themselves and the wiring of the these switches. An embodiment of the BCS binds switches to zones, allowing switches at each entryway to control a specific luminaire, a zone, or all luminaires.

All CEs within a cluster will negotiate with other CEs to run these discovery algorithms, at installation, when a topology change is detected and periodically to confirm adjacency.

Once discovered and zoned, devices need to be calibrated.

Calibration and Manual Commissioning

An embodiment of the system includes the methods used for both manual and automated calibration and commissioning. Calibration here refers to measuring the relationship between power settings applied to each device and the corresponding measurements recorded on all the sensors. The methods apply to calibration of devices, and the effect of these devices in the building.

Device calibration of luminaires includes measuring lumen output per device, lumen efficiency at the desktop, where sensors close to the task surface detect the efficiency of individual and zone luminaires. Calibration can also be performed manually with light measuring devices.

During the self-commissioning process, the system self-calibrates. Each device is tested independently, and measured using internal and surrounding sensors. The system then calibrates devices operating together, and again the devices are measured by internal and surrounding sensors. Self-calibration is performed periodically, often unobtrusively while the system is fully functional.

The system is also designed to optimize manual calibration. Existing techniques to calibrate light sensors, for example, are painstaking and expensive, often requiring manual tweaking of set-points/screws on the sensor itself while on a ladder and in a position that affects the behavior of the sensor. The calibrator must hop on and off a ladder to get the correct results, and then perform this for every sensor since the control logic is in the sensor itself.

In the described embodiment, the system self-commissions where possible, but in some cases manual commissioning is desirable and required. All sensor control logic is centralized in the CE, and correlated with other sensors around it to achieve system level calibration, not individual sensors.

The envisioned system is will support integration with manual calibration devices, and includes full support for role-based workflows that can be setup at the CMS, then downloaded to the calibration device, for example a PDA. Sensor readings will be immediately communicated from the device to the system in one of a variety of mechanisms, including wirelessly and thru the use of light pulses between devices and sensors.

The following embodiments are described:
- The calibration of a single luminaire is measured by multiple sensors and applied to other luminaires in the rest of the system. The system calibrates each luminaire, then settles on a system lumen output set by default or policy.
- The calibration and subsequent settings of each device in a zone and adjacent zones is measured to calibrate the system as a whole. Devices are then adjusted manually or dynamically to comply with policy settings to achieve the system settings required.
- The manual calibration of the output of a single luminaire, for example measured at a desktop surface, can be used to calibrate other luminaires in that zone or connected zones. Adjacent devices in the system can be dynamically, sequentially calibrated, and then the entire system can be calibrated based on consistency/deviation from the calibrated device.

All luminaires in an adjacent zone can be commissioned to conform to the settings of a single luminaire in that zone by adjusting all devices to conform with the behavior of the calibrated and commissioned device.

All communication between manual calibration or commissioning devices and the system is fully automated, based on system workflows. The workflows are designed to minimize user input, and control tasks in a calibration, commissioning or troubleshooting workflow.

Zone bindings of devices are typically automated, but can be executed or adjusted thru manual commissioning. The devices in the entire zone can be confirmed—thru flashing lights—to conclude calibration or zoning workflows, or modified by adding/removing luminaires from the zone by selecting them from the PDA by location and/or light pulse.

A commissioning or calibration workflow may include confirming, correcting or identifying device addresses and locations, for example the location and occupancy associated with a particular luminaire.

The workflows of binding or associating the occupant associated with one or more luminaires can be downloaded to a PDA, and use light levels to confirm the location of the PDA and the location itself. The workflow will coordinate successive locations by flashing lights at the next location.

Devices may dynamically override calibrated or commissioned settings based on user preference.

Centralized Algorithms for Lighting Control

Policies entered at the time of commissioning are to be combined with sensor readings at operating time to come up with multiple strategies (algorithms) for controlling power output to lighting devices. These algorithms optimize light levels for efficiency, security, comfort, safety and other factors.

These algorithms may depend on the nature of the area to be lit (e.g. whether it is an individual work area, a common work area, a hallway, an individual office, a conference room, a restroom etc.) Additionally, the control algorithm may also take into account specific activities (e.g. a meeting or a presentation), tasks or 'scenes'. Depending on the context different algorithms may be deployed for lighting control. These could operate independently or in combination.

An embodiment of the CEs utilizes sensor input from multiple, directly attached or remote devices to control different individual devices. One method is to measure occupancy, motion, temperature and ambient light levels from multiple sensors and use this data to set light levels or control other devices, including HVAC controllers. A building that is fully occupied is managed differently from one that is lightly occupied. Light and environmental controls will adapt based on occupancy; the CEs detect occupancy and set light levels, heat or air-conditioning to appropriate levels, including levels selected by the individual or identified occupants, either manually or adaptively learned from historical preferences. The control algorithms reconcile occupancy, identity, user preferences, time of day and system capabilities with preset policies for comfort, safety, efficiency or cost, including luminaire and LED lifetime, energy efficiency and light levels. This includes the control of multiple luminaires to achieve the best tradeoffs of cost, efficiency and light level—each luminaire is adaptively calibrated for efficiency, performance and lumen output—and adjacent luminaires are controlled based on preset policies. The control algorithms detect ambient light levels near windows and will raise or dim light based on occupancy, preference and policies. These same algorithms will detect a single occupant in a building at night, and adjust light levels and other building systems, including environmental and security controls; this includes lighting the occupied and surrounding areas appropriately, and task lighting when the occupant moves, including lighting appropriate to the occupant's activity, including lighting hallways and different room types as the user moves around the building.

Another method is to use this combined sensor data to detect usage and motion patterns. Another method is to use this sensor data to adaptively learn how various rooms and types of rooms are used. One method includes performing algorithms centrally, rather than at a device, to correlate the data from multiple devices to achieve optimal effectiveness across multiple devices. An example is the management of energy in a building, where daylighting and cooling tradeoffs are calculated to optimize energy savings by selecting whether to close blinds and turn lights up, or open the blinds and turn on air-conditioning.

The following algorithms are further embodiments:

A target light sensor reading or readings is established at the time of initial commissioning. At the time of operation the current light readings are compared with the target sensor reading at a predetermined frequency (e.g. once every five seconds) and depending on the aggregate difference the power supplied to light devices is incremented or decremented. The aggregate difference between current sensor readings and the target readings may be obtained as the sum of squares or of absolute values of the differences.

The current time is compared against values established at the time of initial commissioning to decide if it is a scheduled work time. If yes, normal operating logic is used. If not, an altered target reading is used. This way light is not wasted during scheduled non-work time (e.g. nights, holidays etc.)

Occupancy/motion sensors are used to infer physical occupancy. If the area under question is occupied, normal operating logic is used. If not, an alternative minimum power level is used to avoid wasting power to light unoccupied areas.

In certain areas such as restrooms, stock rooms, wiring closets which are occupied only occasionally, lights are powered off at all times except when occupancy sensors indicate human presence.

Occupancy and motion sensing is typically performed using ultrasonic or passive infrared detectors; these have limitations and will often not detect an occupant who does not move for long periods of time. An embodiment of the LMS/BCS uses low-cost cameras, similar to the video cameras in laptops or digital cameras, in each device, including luminaires, to obtain a picture of the floor below. The CEs combine sensor data for the cameras and other sensors to build a complete view of the floor, and are able to detect even minor changes in the digital image. This enhances the ability of the BCS to detect changes in motion or occupancy to the pixel level. The CEs combine data from multiple sensors centrally, and share this data between CEs to create comprehensive images of the building floor; note that this is a figurative term, since the image is three-dimensional. The CMS uploads these images, and shares this realtime view, creating a combined image for each building floor, affording full control and visual imagery of the building.

Role Based Policy Management

The Central Management System configures policies that govern the operation of the CEs and determines system behavior. It also provides information about a system in use. This requires various human agents to interact with the Central Management System to define, alter and manage policies and request reports. These agents may have differing roles. For example, a wiring technician will interact with the system at set up time establish the spatial relationships between the different components of the system. An IT administrator may need to interact with the Central Management System and CEs to incorporate them into the corporate networking infrastructure. Individual users may wish to log in to control settings of individual areas. Facility managers may need to set up workplace power policies.

Clearly different users will need to have different levels of access to the Central Management System so that they can perform their responsibilities without interfering with the work of others. This brings up the need for a role based management capability. According to an embodiment, the Central Management System will separate out and club together sets of operations (i.e. 'roles') and based on credentials presented by a user at the time of logging in will enable or restrict the user interface accordingly.

Lifecycle Management

An embodiment of the BCS performs algorithms to calibrate and maximize the lifetime of the LEDs on a luminaire, and the luminaire itself, based on luminaire temperature, voltage, current and light output. The algorithm will also increase current to the LEDs as they degrade over time to ensure consistent light output levels.

Direct Current or DC

An embodiment of the CE can be powered by direct current, DC, either from a battery or directly from a solar electric distribution grid/system. The BCS may be simultaneously connected to battery, solar and building electric grids, and enforce policies defined in the CMS to manage power utilization to optimize for energy efficiency, including utilizing solar power to drive the CE and its devices, and charge batteries.

The CE will provide battery backup power to the DC grid, to power other CEs as required. The CE can also deliver DC power to the desktop, directly from its attached DC grid.

Demand Response

An embodiment of the BCS performs algorithms to implement a variety of centrally controlled lighting policies, including demand response algorithms. During peak demand lighting and air-conditioning each consume 30% of a buildings energy footprint. Therefore, energy utilization in a building can be adjusted based on demand response policies, including progressive dimming of light levels and reduced cooling, alternately based on occupancy, and can include adjustments for normal occupancy or optimized occupancy. The CMS will also calculate optimal consolidated occupancy patterns, allowing occupants to congregate efficiently in spaces that are easier to cool. Integration with IT or other building systems can notify occupants to congregate, and power down unused computers and systems. These policies can be preset, or can be enabled manually from a CMS. A single mouse click or command from a Public Utility can dim all lights in a campus by 15%, delay charging of battery backups, switch all power consumption to solar DC, and reduce cooling by increase building temperatures by a degree or two.

Task, Scene and Emergency Lighting Heuristics

An embodiment of the BCS implements lighting management algorithms for task, scene and emergency lighting, as well as algorithms for adaptive learning of lighting patterns. Task lighting algorithms include integration with calendar systems and using flashing lights to remind employees that they are late for meetings, based on office or cubicle occupancy or security badge identification. Scene lighting algorithms include lighting scenes for specific individuals and their tasks, including lighting for a janitor working to a sequence of locations to be cleaned, including light levels around the current location, and flashing lights at the next location, where these lights stop flashing once the location is occupied the janitor. The sequence can be adaptively learned based on prior, observed workflows, or can be pre-programmed and include flashing lights to set task pace. Similarly, a task can include lighting for security guards making rounds in a building, where the path can be preset and turned on or off based on progress, with light levels dimming down behind the guard, and intensifying in front of the guard's progress.

Scene lighting algorithms can include conference rooms lights that dim when the BCS detects that projector is turned on, and turn on when the projector is turned off. Scene lighting can also be controlled by policy rules, including occupancy, time of day and demand response. One example is the use of light to turn on a bathroom's lights; when unoccupied, the bathroom is dark. When the door opens, sensors will detect a change in light and occupancy, and turn on the bathroom lights to a present scene which may be to light only the parts of the bathroom where urinals and vanities are located. If the occupant moves towards a stall, the lights over the stall, possibly adjacent one or all stalls will turn on.

Another embodiment is the use of active training or learning of occupant patterns to optimize control of lights. In the bathroom example above, the system will observe movement, including the rate of movement, to determine how lights should be controlled. For example, if an occupant hesitates before moving into the toilet stall area when it is dark, the system may turn the stall lights up to a certain level to eliminate the hesitation (for whatever reason—darkness, discomfort). Training can be optimized even further to track behavior and preferences of individuals performing different tasks. Examples include tracking an office or cubicle occupant to a particular location and learning his preferences for that location, or using his normal preferences to prelight the scene. Individuals can be recognized based on primary locations of occupancy, or identified through security badges.

Scene lighting can also include security policies, including flashing lights when an occupancy or time off day policy is violated.

Emergency lighting algorithms include flashing lights when an emergency is detected, announcing the emergency over speakers, lighting the pathways to emergency exits, including in sequence towards the exit, based on occupancy and location, mapping building occupancy for security personnel, detecting heat, smoke and other environmental anomalies, including gunfire sound patterns, connecting to emergency responder systems, and powering down non-emergency systems. An embodiment of the system is its ability to profile users and buildings and create usage footprints, and to use this input to generate occupancy optimizations, including those for energy efficiency.

Specific LMS Applications

The LMS/BCS supports algorithms for specific applications, including hotels, schools, hospitals, retail, office-buildings, industrial, parking garages and residential. The CMS is programmed to identify the type of building, and set/manage appropriate policies.

Different buildings have completely different needs. In a hotel, detection of room occupancy (thru keys or physical occupancy), can turn all lighting and environmental systems on/off. In existing parking garages, all lights are typically on; with the BCS, light can be used to control occupancy, consolidating cars at the most efficient floors, for efficient ventilation, lighting and access.

Retail is driven by light levels; studies prove a high correlation between brightness and sales, so existing retail stores keep all lights fully on, whether a section of the store is occupied or not. Efficient light policies will keep traffic areas lit, showcase certain areas, and dim aisles with no occupants, then raise their lights when a shopper passes or enters the aisle.

Schools and other academic institution have very specific and periodic occupancy patterns, as well as very special security requirements. All building systems can be trained to learn the usage patterns of the buildings. The BCS can also detect and identify known and unknown users, including anomalous occupancy patterns. The BCS can respond to emergencies in specific ways, including locking down classrooms when emergencies or gunshots are detected by the system.

The latest building regulations for residences require occupancy detection in bathrooms, but not in the rest of the house. Residences are heated and cooled, but only large, expensive houses have zones. The BCS can optimize all residential systems, including heating and cooling, to deliver this where needed.

An Example System Embodiment

A system architecture for a Light Management System (LMS), including an architecture for Solid State Lights, consisting of sensors, luminaires and facility infrastructure devices, CEs and CMSes that monitor and control the environment as described.

A system architecture for, and methods for managing, a Building Control System (BCS), comprising, but not limited to:
  A network of Control Engines, that power and control a number of connected devices, including SSL luminaires, sensors, Human Interface Devices and other devices.
  Centralized Management Systems that manage a number of Control Engines.
  Solid State Light luminaires, including embedded sensors or other devices.
  Sensors, including, but not limited to, ambient light, temperature, voltage, current, occupancy, motion, air quality sensors.
  Human Interface Devices, including switches, touch panels, commissioning and calibration devices.
  Emergency devices, including emergency lighting, smoke detectors.

The BCS embodiment comprises a common appliance to centrally power, control and manage a large number of low voltage devices, including SSL luminaires and sensors, described as a Control Engine (CE), where the number of devices is limited by the delivered power capacity of the appliance.

Each luminaire, device or sensor is powered by, controlled by and connected to the Control Engine. The Control Engines are powered by AC, DC battery backups, or a DC grid that is optionally powered by solar photo-electric devices. The CEs form clusters to share configuration and state information and implement the environmental control algorithms in distributed fashion.

The Control Engine incorporates a headless mode of operation in which power is conveyed to devices without active control from the CE in the event of CE failure other than the power sub-system. In this mode, a connected HID device sends a signal to force the CE to power its attached device on or off. A HID device may force the entire cluster of CEs to power on or off.

The embodiment includes methods of clustering comprising a method of CE discovery to identify connected CEs, a method of topology discovery performed by the CEs (as described above) to identify the topology of adjacent luminaires, sensors and HIDs, by relying on the use of light to sense adjacent luminaires and a method of zoning performed by the cluster of CEs to group adjacent luminaires into zones.

This zoning embodiment further comprises a method of dynamic or manual logical binding of HID devices to zones, unconstrained by physical topology. This includes the binding of multiple HID devices (or a software embodiment of a switch of dimmer on a HID) to a zone, each performing the function of a single N-way switch of dimmer. A HID device may be physical switch or dimmer, or a touch-panel, PDA or a computer, containing a software embodiment of a switch or dimmer deployed individually or multiply on the HID.

Each CE performs centralized algorithms to centrally process sensor data from individual sensors, either local or remote. The CEs perform centralized control of individual devices based on input from multiple, adjacent sensors. Sensors on each luminaire or other device perform occupancy sensing, including video cameras utilized to obtain video imagery of the room below. The occupancy sensing data can be used to control SSL lighting and other devices based on efficiency, occupancy, lifetime, security, productivity, individual preferences, and psychological comfort tradeoffs.

The embodiment includes methods for self-commissioning and calibration that allow SSL luminaires to be plug and play at installation. A further optimization is automated commissioning, including a method for the propagation of calibration of a single device, including luminaires, to all adjacent, equivalent devices. Other embodiments comprise methods of manual commissioning and calibration, including optimized workflows, as described above.

The embodiment includes methods of power efficiency management of the entire BCS, including luminaires and HVAC, including the calculation of optimal power use between different devices or BCS systems, the calculation of optimal occupancy to achieve BCS system-wide efficiencies, demand response, loss of AC power, emergencies and policy.

The embodiment includes methods for identification of emergencies, including detection of smoke or other environmental factors, the sound of gunshots or unidentified occupants. During emergencies, the embodiment further comprising methods for device management during emergencies, including use of lights and other devices to announce or alert occupants to emergencies, use of lights to directionally illuminate emergency pathways, use of control devices to lockdown areas, use of occupancy sensing to track and identify occupants.

The embodiment include heuristics and system training of occupant usage and preferences, tasks and scenes, and facility (rooms, hallways, etc) usage and profiling, the illumination and dimming of light during execution of tasks, the use of lights to set task pace. This includes the integration with office systems and occupancy detection and identification; including to track individuals, to flash lights when meeting attendees are late for meetings and to illuminate meeting rooms prior to scheduled events.

What is claimed:

1. A method of controlling and managing a plurality of luminaires, comprising:
sensing, by a sensor of each of the plurality of luminaires, light received by the sensor;
communicating, by a device, with the plurality of luminaires through light pulses that are sensed by the sensors;
commissioning and calibrating the plurality of luminaires using the communication; and
placing, by the device, at least one of the plurality of luminaires on a floor plan through the communication with light pulses, wherein the at least one of the plurality of luminaires identifies itself over a network;
collecting data from the plurality of luminaires;
using the collected data to determine an adjacency of lights and other devices; and
dynamically placing the plurality of lights and other device into zones and binding human interfaces to the zones; and
dynamically configuring the device to control the zones, wherein at least one of the human interfaces comprises the device.

2. The method of claim 1, wherein using light levels to confirm the location of the PDA comprises coordinating flashing of successive locations of lights.

3. The method of claim 1, further comprising establishing a target light sensor reading at a time of initial commissioning of the plurality of luminaires, and comparing current light readings with the target light sensor reading for calibrating each sensor at a ceiling versus light readings at a work surface.

4. The method of claim 3, wherein the current light readings with the target light sensor reading are compared at a predetermined frequency.

5. The method of claim 3, further comprising incrementing or decrementing power supplied to the plurality of luminaires depending on an aggregate difference between the current light readings with the target light sensor reading.

6. The method of claim 1, further comprising determining occupancy utilizing low-cost cameras.

7. The method of claim 6, further comprising generating pictures of floors below the cameras, and sensing occupancy by detecting changes in images produced by the cameras.

8. The method of claim 7, further comprising system managers sharing the pictures, and creating comprehensive images of a building floor based on the shared pictures.

9. A The method of claim 2,
wherein the device comprises a calibration device, and light levels are used to confirm a location of the calibration device.

10. The method of claim 9, wherein the calibration device comprises a personal digital assistant (PDA).

11. A system for managing a lighting, comprising:
a plurality of luminaires, wherein a sensor of each of the plurality of luminaires senses light received by the sensor;
a device, wherein the device is operative to:
communicate with the plurality of luminaires through light pulses that are sensed by the sensors; and
commission and calibrate the plurality of luminaires using the communication; and
place at least one of the plurality of luminaires on a floor plan through the communication with light pulses;
wherein the at least one of the plurality of luminaires identifies itself over a network; and
wherein the network is operative to:
collect data from the plurality of luminaires;
use the collected data to determine an adjacency of luminaires; and
dynamically place the plurality of luminaires into zones and binding human interfaces to the zones; and
dynamically configure the device to control the zones, wherein at least one of the human interfaces comprises the device.

12. The system of claim 11, wherein using light levels to confirm the location of the PDA comprises coordinating flashing of successive locations of lights.

13. The system of claim 11, further comprising establishing a target light sensor reading at a time of initial commissioning of the plurality of luminaires, and comparing current light readings with the target light sensor reading,
to efficiently manage the plurality of lights and devices.

* * * * *